US009502165B2

(12) United States Patent
Horiuchi et al.

(10) Patent No.: US 9,502,165 B2
(45) Date of Patent: *Nov. 22, 2016

(54) PERMANENT MAGNET, MOTOR, AND GENERATOR

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Keiko Okamoto, Kanagawa (JP); Masaya Hagiwara, Kanagawa (JP); Tsuyoshi Kobayashi, Kanagawa (JP); Masaki Endo, Tokyo (JP); Tadahiko Kobayashi, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/661,119

(22) Filed: Mar. 18, 2015

(65) Prior Publication Data
US 2015/0228385 A1 Aug. 13, 2015

Related U.S. Application Data

(63) Continuation of application No. PCT/JP2013/005462, filed on Sep. 13, 2013.

(51) Int. Cl.
*H02K 21/00* (2006.01)
*H02K 15/12* (2006.01)
(Continued)

(52) U.S. Cl.
CPC ............... *H01F 1/055* (2013.01); *C22C 19/07* (2013.01); *C22C 30/00* (2013.01); *C22C 30/02* (2013.01);
(Continued)

(58) Field of Classification Search
CPC .............................. H02K 21/00; H01F 7/00
USPC ....... 310/44, 152, 156.01; 148/101–103, 303
See application file for complete search history.

(56) References Cited

U.S. PATENT DOCUMENTS

| 4,746,378 A | 5/1988 | Wysiekierski et al. |
| 8,179,068 B2 | 5/2012 | Yuuki et al. |

(Continued)

FOREIGN PATENT DOCUMENTS

| CN | 103036323 | 4/2013 |
| JP | 63-149362 | 6/1988 |

(Continued)

OTHER PUBLICATIONS

International Search Report for International Patent Application No. PCT/JP2013/005462 Dated Dec. 17, 2013, 5 pages.

(Continued)

*Primary Examiner* — Jose Gonzalez Quinones
(74) *Attorney, Agent, or Firm* — Amin, Turocy & Watson LLP

(57) ABSTRACT

A permanent magnet includes: a composition expressed by a composition formula: $R_pFe_qM_rCu_tCo_{100-p-q-r-t}$ (R is at least one element selected from rare-earth elements, M is at least one element selected from Zr, Ti, and Hf, $10.5 \leq p \leq 12.5$ at %, $23 \leq q \leq 40$ at %, $0.88 \leq r \leq 4.5$ at %, $4.5 \leq t \leq 10.7$ at %); and a metal structure containing a $Th_2Zn_{17}$ crystal phase and a Cu-rich phase having a Cu concentration higher than that of the $Th_2Zn_{17}$ crystal phase. In a cross section including a c-axis of the $Th_2Zn_{17}$ crystal phase, a number of intersections of the Cu-rich phases existing in an area of 1 μm square is 10 or more.

12 Claims, 4 Drawing Sheets

(51) Int. Cl.
    *H01F 1/057*   (2006.01)
    *H01F 1/055*   (2006.01)
    *H01F 1/08*    (2006.01)
    *C22C 19/07*   (2006.01)
    *C22C 30/02*   (2006.01)
    *H02K 1/02*    (2006.01)
    *C22C 30/00*   (2006.01)
    *C22C 38/00*   (2006.01)
    *C22F 1/10*    (2006.01)
    *H01F 1/059*   (2006.01)

(52) U.S. Cl.
    CPC ............. *C22C 38/00* (2013.01); *H01F 1/0557* (2013.01); *H01F 1/086* (2013.01); *H02K 1/02* (2013.01); *B22F 2998/10* (2013.01); *B22F 2999/00* (2013.01); *C22F 1/10* (2013.01); *H01F 1/0596* (2013.01)

(56) References Cited

U.S. PATENT DOCUMENTS

| | | | |
|---|---|---|---|
| 8,552,678 | B2 | 10/2013 | Yuuki et al. |
| 8,884,576 | B2 | 11/2014 | Yuuki et al. |
| 2011/0278976 | A1 | 11/2011 | Horiuchi et al. |
| 2012/0146444 | A1* | 6/2012 | Horiuchi ................. C22C 19/07 310/152 |
| 2013/0082559 | A1 | 4/2013 | Hagiwara et al. |
| 2014/0184133 | A1 | 7/2014 | Yuuki et al. |

FOREIGN PATENT DOCUMENTS

| | | |
|---|---|---|
| JP | 63-157844 | 6/1988 |
| JP | 63-157845 | 6/1988 |
| JP | 06-212327 | 8/1994 |
| JP | 06-322465 | 11/1994 |
| JP | 09-111383 | 4/1997 |
| JP | 10-070023 | 3/1998 |
| JP | 2893265 | 5/1999 |
| JP | 2003-133118 | 5/2003 |
| JP | 2008-029148 | 2/2008 |
| JP | 2008-043172 | 2/2008 |
| JP | 2010-121167 | 6/2010 |
| JP | 2013-074235 | 4/2013 |

OTHER PUBLICATIONS

Written Opinion for International Patent Application No. PCT/JP2013/005462 Dated Dec. 17, 2013, 3 pages.

Japanese Office Action for Japanese Patent Application No. 2015-505363 mailed on Mar. 15, 2016.

International Preliminary Report on Patentability for International Patent Application No. PCT/JP2013/005462 mailed on Mar. 24, 2016.

Japanese Office Action for Japanese Patent Application No. 2015-505363 mailed on Jun. 7, 2016.

* cited by examiner

PERMANENT MAGNET, MOTOR, AND GENERATOR

CROSS-REFERENCE TO RELATED APPLICATIONS

This application is a continuation of prior International Application No. PCT/JP2013/005462 filed on Sep. 13, 2013; the entire contents of all of which are incorporated herein by reference.

FIELD

Embodiments described herein generally relate to a permanent magnet, a motor, and a power generator.

BACKGROUND

As examples of a high-performance rare-earth magnet, a Sm—Co-based magnet and a Nd—Fe—B-based magnet and so on are known. In these magnets, Fe and Co contribute to an increase in saturation magnetization. Further, in theses magnets, rare-earth elements such as Nd and Sm are contained to bring about large magnetic anisotropy resulting from behaviors of 4f electrons of the rare-earth elements in a crystal field. This makes it possible to obtain a high coercive force and realize the high-performance magnet.

Such a high-performance magnet is mainly used in electric devices such as motors, speakers, and measuring instruments. There is an increasing demand for a reduction in weight and a reduction in power consumption of various kinds of electric devices, and in order to cope with this, there is a demand for a higher-performance permanent magnet whose maximum magnetic energy product (BHmax) is improved. In recent years, a variable magnetic flux motor has been proposed and contributes to an increase in efficiency of the motor.

The Sm—Co-based magnet has a high Curie temperature and thus can realize an excellent motor property at high temperature, but there is a demand for a higher coercive force, higher magnetization, and improvement in squareness ratio. In order for higher magnetization of the Sm—Co-based magnet, increasing the Fe concentration is considered to be effective, but the squareness ratio tends to decrease due to increasing the Fe concentration in manufacturing methods in prior arts. In order to realize a high-performance magnet for motor, a technique of enabling an excellent squareness ratio while improving the magnetization in a composition with a high Fe concentration is requested.

DETAILED DESCRIPTION

Figure 1:
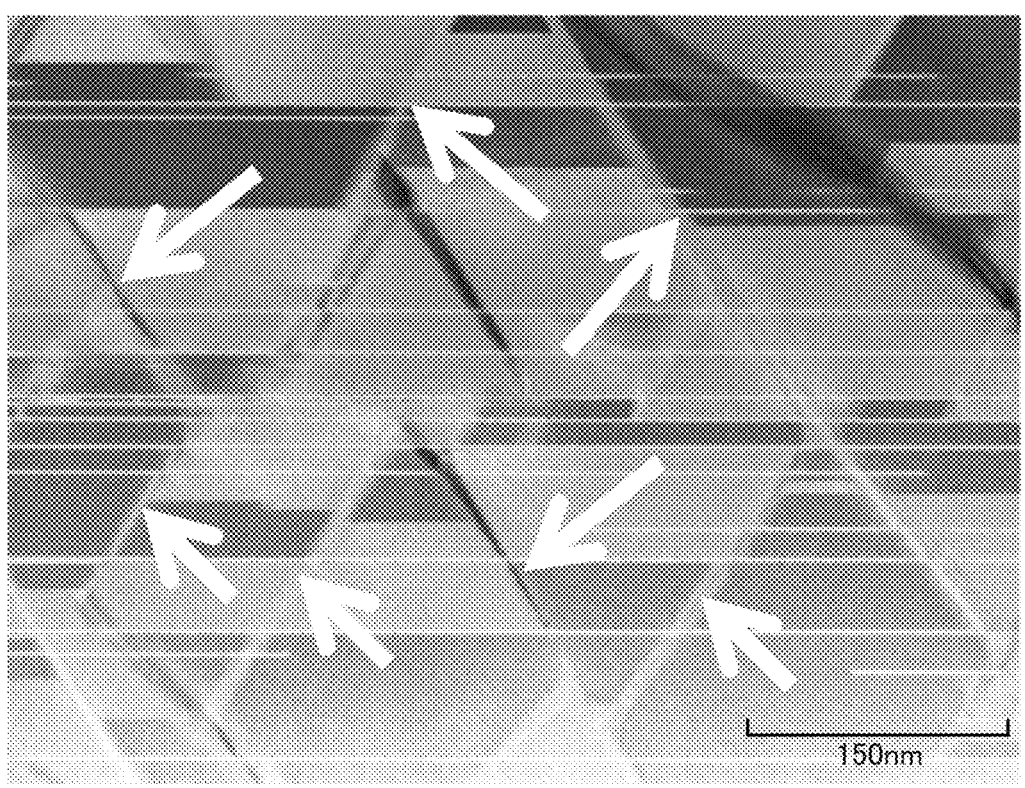
FIG. 1 is a view showing an example of a bright-field image by a TEM.

A permanent magnet in an embodiment includes: a composition expressed by a composition formula: $R_p Fe_q M_r Cu_t Co_{100-p-q-r-t}$, where R is at least one element selected from the group consisting of rare-earth elements, M is at least one element selected from the group consisting of Zr, Ti, and Hf, p is a number satisfying $10.5 \le p \le 12.5$ at %, q is a number satisfying $23 \le q \le 40$ at %, r is a number satisfying $0.88 \le r \le 4.5$ at %, and t is a number satisfying $4.5 \le t \le 10.7$ at %; and a metal structure containing a $Th_2Zn_{17}$ crystal phase and a Cu-rich phase having a Cu concentration higher than that of the $Th_2Zn_{17}$ crystal phase. In a cross section including a c-axis in the $Th_2Zn_{17}$ crystal phase, a number of intersections of the Cu-rich phases existing in an area of 1 μm square is 10 or more.

First Embodiment

A permanent magnet in an embodiment will be described below.

<Configuration Example of Permanent Magnet>

A permanent magnet in this embodiment includes a composition expressed by a composition formula: $R_p Fe_q M_r Cu_t Co_{100-p-q-r-t}$, where R is at least one element selected from rare-earth elements, M is at least one element selected from Zr, Ti, and Hf, p is a number satisfying $10.5 \le p \le 12.5$ at %, q is a number satisfying $23 \le q \le 40$ at %, r is a number satisfying $0.88 \le r \le 4.5$ at %, and t is a number satisfying $4.5 \le t \le 10.7$ at %.

The element R in the above composition formula is an element that can bring about large magnetic anisotropy in the magnet material. As the element R, one or more elements selected from rare-earth elements including yttrium (Y) can be used and, for example, samarium (Sm), cerium (Ce), neodymium (Nd), and praseodymium (Pr) and the like can be used and, in particular, use of Sm is desirable. For example, in the case where a plurality of elements including Sm are used as the element R, setting the concentration of Sm to 50 at % or more of the whole elements applicable as the element R makes it possible to increase performance of the magnet material such as a coercive force.

It is more preferable to set the concentration of Sm to 70 at % or more of the elements applicable as the element R. Any of the elements applicable as the element R brings about large magnetic anisotropy in the magnet material, and setting the concentration of the elements applicable as the element R to 10.5 at % or more and 12.5 at % or less makes it possible to increase the coercive force. When the concentration of the elements applicable as the element R is less than 10.5 at %, a large amount of α-Fe precipitates to decrease the coercive force, whereas when the concentration of the elements applicable as the element R exceeds 12.5 at %, saturation magnetization decreases. The concentration of the elements applicable as the element R is preferably 10.7 at % or more and 12.3 at % or less, and more preferably 10.9 at % or more and 12.1 at % or less.

M in the above composition formula is an element for enabling a high coercive force to be exhibited in a composition with a high Fe concentration. As the element M, for example, one or more elements selected from titanium (Ti), zirconium (Zr), and hafnium (Hf) is/are used. When the content r of the element M is 4.5 at % or more, a heterophase excessively containing the element M is likely to be generated, and both the coercive force and magnetization are likely to decrease. When the content r of the element M is less than 0.88 at %, the effect of increasing the Fe concentration is likely to decrease. In other words, the content r of the element M is preferably 0.88 at % or more and 4.5 at % or less. Further, the content r of the element M is preferably 1.14 at % or more and 3.58 at % or less, and more preferably 1.49 at % or more and 2.24 at % or less.

The element M may be any one of Ti, Zr, Hf and preferably contains at least Zr. Especially when 50 at % or more of the element M is Zr, it is possible to increase the coercive force of the permanent magnet. On the other hand, Hf in the element M is particularly expensive, and thus even when Hf is used, the amount of Hf used is preferably small. For example, the content of Hf is preferably less than 20 at % of the element M.

Cu is an element for enabling a high coercive force to be exhibited in the magnet material. The content of Cu is preferably 3.5 at % or more and 10.7 at % or less. When a larger amount of Cu is compounded, a decrease in magnetization is significant, whereas when a smaller amount of Cu is compounded, it becomes difficult to obtain a high coercive force and an excellent squareness ratio. The content t of Cu is preferably 3.9 at % or more and 9.0 at % or less, and more preferably 4.3 at % or more and 5.8 at % or less.

Fe is an element mainly responsible for magnetization of the magnet material. When a large amount of Fe is compounded, saturation magnetization of the magnet material can be increased. However, when Fe is compounded too much, precipitation of α-Fe and phase separation make it difficult to obtain a desired crystal phase, and may decrease the coercive force. Accordingly, the content q of Fe is preferably 23 at % or more and 40 at % or less. The content q of Fe is more preferably 26 at % or more and 36 at % or less, and still more preferably 29 at % or more and 34 at % or less.

Co is an element responsible for magnetization of the magnet material and for enabling a high coercive force to be exhibited. Moreover, when a large amount of Co is compounded, a high Curie temperature can be obtained, so that Co also has a function of improving thermal stability of the magnet property. When the compounding amount of Co is small, these effects are likely to decrease. However, when Co is added too much, the ratio of Fe relatively decreases and may decrease the magnetization. For example, substituting Ni, V, Cr, Mn, Al, Si, Ga, Nb, Ta, W for 20 at % or less of Co can improve the magnet property such as the coercive force. However, excessive substitution may decrease the magnetization, and therefore the substitution amount is preferably 20 at % or less of Co.

The permanent magnet in this embodiment further includes a metal structure including a plurality of hexagonal $Th_2Zn_{17}$ crystal phases (2-17 crystal phases) and a plurality of Cu-rich phases higher in Cu concentration than the $Th_2Zn_{17}$ crystal phases.

A Sm—Co-based magnet generally includes, in its sectional structure, a two-dimensional metal structure including a cell phase of the $Th_2Zn_{17}$ crystal phase (2-17 phase) and a cell wall phase of a hexagonal $CaCu_5$ crystal phase (1-5 crystal phase). For example, the cell wall phase is one of the Cu-rich phases and is a grain boundary phase existing at a grain boundary of the cell phase, and the plurality of cell phases are partitioned by the cell wall phase. The above structure is also called a cell structure.

The Cu-rich phase is a phase higher in Cu concentration than the $Th_2Zn_{17}$ crystal phase. Preferably, the Cu concentration in the Cu-rich phase is higher than the Cu concentration in the $Th_2Zn_{17}$ crystal phase and is, for example, 30 at % or more. The Cu-rich phase exists in a linear shape or plate shape in the cross section including the c-axis in the $Th_2Zn_{17}$ crystal phase. The structure of the Cu-rich phase is not particularly limited but, for example, a hexagonal $CaCu_5$ crystal phase (1-5 crystal phase) can be exemplified. Further, the permanent magnet in this embodiment may include a plurality of Cu-rich phases different in phase.

In this embodiment, the observation of the metal structure such as the $Th_2Zn_{17}$ crystal phase and the Cu-rich phase is recognized as follows for instance. First, observation of a sample under a transmission electron microscope (TEM). The sample used in the above observation is a sample after a main aging treatment. At this time, the sample is preferably an unmagnetized article.

The concentration of each element in the $Th_2Zn_{17}$ crystal phase and the Cu-rich phase can be measured using, for example, a TEM-energy dispersive X-ray spectroscopy (TEM-EDX). The TEM observation is performed with, for example, a 200 k-fold magnification. In this embodiment, a cross section including the c-axis in the $Th_2Zn_{17}$ crystal phase is observed.

For measurement of the concentration of each element in each phase, in particular, a phase such as a cell wall between cell phases, a 3-dimensional atom probe (3DAP) is preferably used. In the case of analysis by the TEM-EDX, even if the phase between the cell phases is observed, it may be impossible to accurately measure the concentration of each element in the phase between the cell phases because a transmission electron beam is transmitted through both of the cell wall phase and the cell phase. For example, the Sm concentration or the like sometimes becomes slightly higher (about 1.2 times to about 1.5 times the measurement value by the 3DAP).

The measurement of the concentration of the element in each phase by the 3DAP is performed in the following procedure. First, the sample is thinned by dicing, and from the thinned sample, a needle-shaped sample for pickup atom probe (AP) is fabricated by a focused iron beam (FIB). Based on plane spacing (about 0.4 nm) of atomic planes (0003) of the $Th_2Zn_{17}$ crystal phase parallel to a phase (M-rich phase) in a plate shape rich in the element M such as Zr or the like generated vertically to the c-axis in the $Th_2Zn_{17}$ crystal phase, an atom map is created. Regarding atom probe data thus created, a profile of only Cu is created, and a place where Cu is thickened is specified. This site rich in Cu corresponds to the Cu-rich phase.

A Cu concentration profile is analyzed in a direction vertical to the Cu-rich phase. An analysis range of the concentration profile is preferably 10 nm×10 nm×10 nm or 5 nm×5 nm×10 nm. A highest value (PCu) of the Cu concentration is found from the Cu concentration profile obtained by the analysis. Such measurement is conducted at 20 points in the same sample from the Cu concentration profile, and an average value of measurements is defined as the Cu concentration.

The measurement by the TEM-EDX or the 3DAP is conducted for an interior portion of a sintered compact. The measurement of the interior portion of the sintered compact means as follows. First, the composition is measured at a surface portion and an interior portion of a cross section cut at a middle portion of the longest side in a surface having the largest area, vertically to the side (vertically to a tangent of the middle portion in the case of a curve). As for measurement points, first reference lines that are drawn from ½ positions of respective sides in the aforesaid cross section as starting points up to end portions toward an inner side vertically to the sides, and second reference lines that are drawn from the middles of respective corner portions as starting points up to end portions toward the inner side at ½ positions of interior angles of the corner portions, are provided. Then, positions of 1% of the lengths of the reference lines from the starting points of these first reference lines and the second reference lines are defined as the surface portion, and positions of 40% thereof are defined as the interior portion. Note that when the corner portion has a curvature because of chamfering or the like, the intersection of extensions of adjacent sides is defined as end portions of the sides (middle of the corner portion). In this case, the measurement point is a position not from the intersection but from portions in contact with the reference lines.

When the measurement points are set as above, in the case where the cross section is, for example, a quadrangle, the number of the reference lines is totally eight composed of the four first reference lines and the four second reference lines, and the number of the measurement points is eight in each of the surface portion and the interior portion. In this embodiment, the eight points in each of the surface portions and the interior portion all preferably are within the aforesaid composition range, but at least four points or more in each of the surface portion and the interior portion only need to be within the aforesaid composition range. This case does not define the relation between the surface portion and the interior portion at one reference line. The observation is conducted after an observation surface of the interior portion of the sintered compact thus defined is smoothed by polishing. For example, the observation points by the TEM-EDX are arbitrary 20 points in the cell phase and the Cu-rich phase, and an average value of measurement values obtained by excluding the maximum value and the minimum value from the measurement values at these points is found, and this average value is set as the concentration of each element. This also applies to the measurement by the 3DAP.

In the measurement result of the concentration in the Cu-rich phase using the above-described 3DAP, the concentration profile of Cu in the Cu-rich phase is preferably shaper. Concretely, a full width at half maximum (FWHM) of the concentration profile of Cu is preferably 5 nm or less and, in such a case, a higher coercive force can be obtained. This is because when the distribution of Cu in the Cu-rich phase is sharp, a difference in domain wall energy sharply occurs between the cell phase and the Cu-rich phase and the domain wall becomes more likely to be pinned.

The full width at half maximum (FWHM) of the concentration profile of Cu in the Cu-rich phase is found as follows. The highest value (PCu) of the Cu concentration is found from the Cu profile by the 3DAP on the basis of the above-described method, and a width of a peak whose value is half the aforesaid value (PCu/2), namely, the full width at half maximum (FWHM) is found. Such measurement is conducted for ten peaks, and an average value of the values is defined as the full width at half maximum (FWHM) of the Cu profile. When the full width at half maximum (FWHM) of the Cu profile is 3 nm or less, the effect of improving the coercive force is further improved, and when it is 2 nm or less, a higher effect of improving the coercive force can be obtained.

An example of a bright-field image obtained by observation of the cross section including the c-axis of the $Th_2Zn_{17}$ crystal phase by the TEM is illustrated in FIG. 1. Portions with arrows illustrated in FIG. 1 are the Cu-rich phases.

Figure 2:
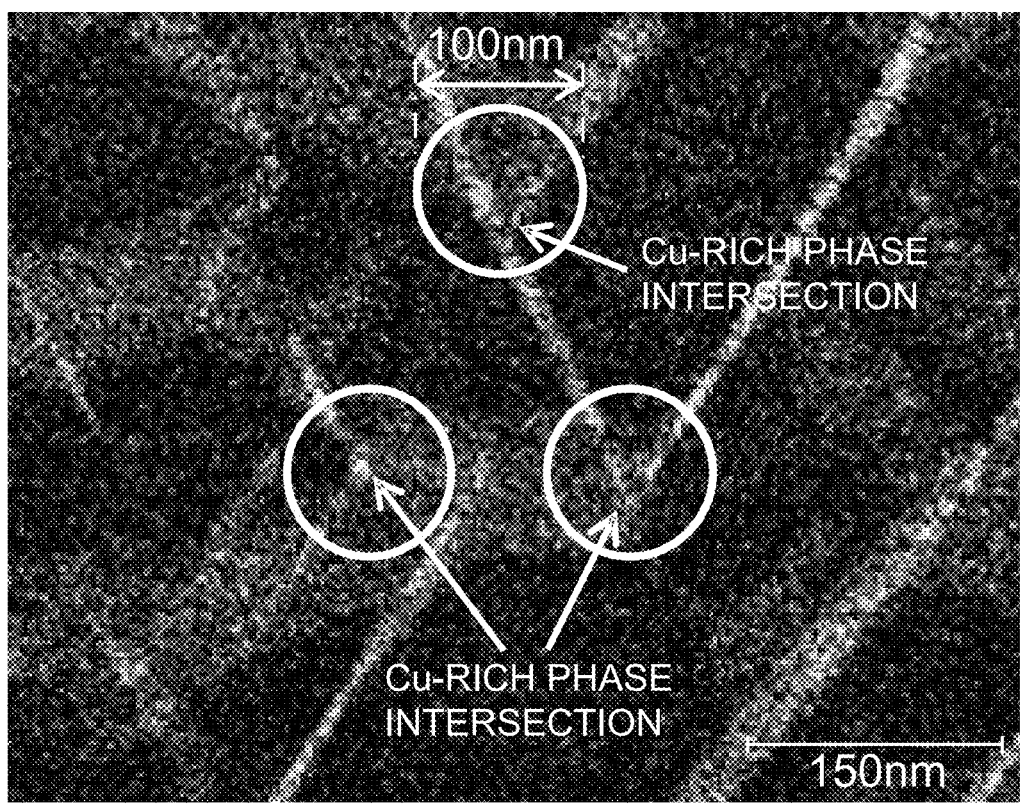
FIG. 2 is a view showing an example of a mapping result by a TEM-EDX.

Further, an example of a mapping result by the TEM-EDX is illustrated in FIG. 2. In FIG. 2, a portion whose longitudinal direction extends in one direction in a white plate-shape region is regarded as one Cu-rich phase.

The domain wall energy of the Cu-rich phase is higher than the domain wall energy of the $Th_2Zn_{17}$ crystal phase, and the difference in domain wall energy becomes a barrier of domain wall displacement. More specifically, the Cu-rich phase functions as a pinning site and thereby can suppress the domain wall displacement between the plurality of cell phases. This is also called a domain wall pinning effect.

In the Sm—Co-based magnet containing 23 at % or more Fe, the Cu concentration in the Cu-rich phase is preferably 30 at % or more. In the region where the Fe concentration is high, the Cu concentration in the Cu-rich phase become more likely to vary and, for example, a Cu-rich phase having a high domain wall pinning effect and a Cu-rich phase having a low domain wall pinning effect are generated and likely to cause a decrease in coercive force and squareness ratio. The Cu concentration is more preferably 35 at % or more, and still more preferably 40 at % or more.

When the domain wall leaving the pinning site is displaced, the magnetization is reversed by the amount of the displacement and therefore decreases. If the domain walls leave the pinning sites all at once with a certain magnetic field at the time when an external magnetic field is applied, the magnetization does not decrease with respect to the application of the magnetic field due to application of a magnetic field at a midpoint, resulting in an excellent squareness ratio. In other words, it is considered that at the time when a magnetic field is applied, if the domain wall leaves the pinning site and is displaced with a magnetic field lower than the coercive force, the magnetization decreases by the amount of the displacement to lead to deterioration in squareness ratio. To suppress the deterioration in squareness ratio, it is considered to be important to increase the domain wall pinning effect and, even if the domain wall leaves a pinning site, to perform pining of the domain wall again at another pinning site so as toe the region where the magnetization is reversed.

There is a case where even though the Cu-rich phases being pinning sites are densely generated in order to perform pinning for the domain wall leaving a certain pinning site by another pinning site, the squareness ratio is not improved. Further, there is a phenomenon that even though the Cu-rich phases are densely generated, the magnetization decreases. The cause of the decrease in magnetization seems to relate to that the dense generation of the Cu-rich phases results in a decrease in ratio of the $Th_2Zn_{17}$ crystal phase being the cell phase. The $Th_2Zn_{17}$ crystal phase is a phase responsible for magnetization in the Sm—Co-based permanent magnet, and a decrease in volume fraction of the $Th_2Zn_{17}$ crystal phase is considered to cause a decrease in magnetization.

After close examination of the cause of there being a case where the squareness ratio is improved and a case where it is not improved even through the Cu-rich phases are densely creased, it has been found that the Cu-rich phase has characteristics in generation form. More specifically, it has been found that the Cu-rich phases intersect or come into contact with each other and thereby improve the squareness ratio. On the other hand, a sample, which is not excellent in squareness ratio even if the Cu-rich phases are densely creased, has fewer points where the Cu-rich phases intersect or come into contact with each other.

The difference in squareness ratio due to the difference in the generation form of the Cu-rich phase means the difference in displacement of the domain wall due to the difference in structure. For example, the Cu-rich phases intersecting or coming into contact with each other and the Cu-rich phases surrounding the $Th_2Zn_{17}$ crystal phase makes it possible to increase the effect of suppressing the domain wall displacement. On the other hand, when the Cu-rich phases do not intersect or come into contact with each other, the domain wall is displaced by slipping between the plurality of Cu-rich phases even if they are densely generated, resulting in a decreased squareness ratio. Further, the Cu concentration at the intersection of the Cu-rich phases is sometimes higher than the Cu concentration in the other region of the Cu-rich phase, and the intersection itself is considered to become a strong pinning site.

The permanent magnet in this embodiment has an intersection of the Cu-rich phases. Concretely, in the cross section including the c-axis of the $Th_2Zn_{17}$ crystal phase, the number of intersections of the Cu-rich phases existing in an area of 1 µm square is set 10 or more, and the number of intersections of the Cu-rich phases existing in an area of 500 nm square is preferably set to 15 or more. Note that the upper limit of the number of intersections of the Cu-rich phases is not particularly limited, but may be set to, for example, 120 or less.

In an actual sample, the intersection of the Cu-rich phases is recognized as follows for instance.

First, in the mapping result in FIG. 2, a circle of a diameter of 100 nm is drawn around a point which is considered to be an intersection of the Cu-rich phases. Next, the Cu-rich phases in the circle of the diameter of 100 nm are visually found. In this event, when two or more Cu-rich phases having longitudinal directions extending in different directions exist in the circle of the diameter of 100 nm and the two or more Cu-rich phases are in contact or intersect with each other, the contact point or the intersection is recognized as the intersection of the Cu-rich phases.

Further, not limited to the above, even when two or more Cu-rich phases are not in contact or does not intersect with each other, for example, if two or more Cu-rich phases having longitudinal directions are not in parallel and, when at least one of the two or more Cu-rich phases is extended in the longitudinal direction, the two or more Cu-rich phases are in contact or intersect with each other in the circle, the contact point or the intersection generated when it is extended is recognized as the intersection of the Cu-rich phases.

Further, the number of intersections of the Cu-rich phases is counted as follows.

First, the number of intersections of the Cu-rich phases is counted in an area of 1 µm square at an arbitrary observation position in the sample. The above operation is performed at seven fields of view with the observation position changed in the same sample, and an average of five results except the result of the maximum number of intersections and the minimum number of intersections is regarded as the number of intersections of the Cu-rich phases existing in the area of 1 µm square.

Note that the squareness ratio is defined as follows. First, a DC magnetizing property at room temperature is measured by a DC B-H tracer. Next, from a B-H curve obtained by the measurement result, a residual magnetization $M_r$, a coercive force $_iHc$, and a maximum energy product (BH)max which are basic magnet properties of the magnet are found. In this event, a theoretical maximum value (BH)max is obtained using Mr by the following formula (1).

$$(BH)\text{max(theoretical value)}=M_r^2/4\mu_0 \quad (1)$$

The squareness ratio is evaluated by a ratio between (BH)max obtained by the measurement and (BH)max (theoretical value) and can be obtained by the following formula (2).

$$(BH)\text{max(actual measured value)}/(BH)\text{max(theoretical value)}\times 100 \quad (2)$$

Note that the permanent magnet in this embodiment is used, for example, also as a bond magnet. For example, using the magnet material in this embodiment for a variable magnet in a variable magnetic flux drive system as disclosed in JP-A No. 2008-29148 or JP-A No. 2008-43172, enables increased efficiency, downsizing, and cost reduction of the system. For using the magnet material in this embodiment for a variable magnet, it is necessary to change the aging treatment condition to keep the coercive force within 100 kA/M or more and 350 kA/M or less.

<Manufacturing Method of Permanent Magnet>

Next, an example of a manufacturing method of a permanent magnet will be described.

First, an alloy powder containing predetermined elements necessary for synthesis of the permanent magnet is prepared. The alloy powder can be prepared, for example, by fabricating an alloy thin strip in a flake form by a strip cast method and thereafter grindingthe alloy thin strip. In the fabrication of the alloy thin strip using the strip cast method, by tiltingly injecting an alloy molten metal to a chill roll rotating at a circumferential speed of 0.1 m/sec or more and 20 m/sec or less, a continuously solidified thin strip with a thickness of 1 mm or less can be fabricated. When the circumferential speed is less than 0.1 m/sec, a composition variation is likely to occur in the thin strip. On the other hand, when the circumferential speed is over 20 m/sec, crystal grains become fine to a single domain size or less, and therefore the magnetic property may decrease. The circumferential speed of the chill roll is 0.3 m/sec or more and 15 m/sec or less, and more preferably 0.5 m/sec or more and 12 m/sec or less. Further, the alloy powder can be prepared also by grinding an alloy ingot obtained by casting after arc melting or high-frequency melting. Furthermore, the alloy powder may be prepared using a mechanical alloying method, a mechanical grinding method, a gas atomizing method, a reduction diffusion method, or the like.

Further, performing a heat treatment on the alloy powder or a material of an alloy before grinding makes it possible to homogenize the material. The material can be ground using, for example, a jet mill, a ball mill or the like. Note that grinding the material in an inert gas atmosphere or an organic solvent makes it possible to prevent oxidation of the powder.

The powder obtained after the grinding has an average grain size of 2 µm or more and 5 µm or less and has a ratio of powder having a grain size of 2 µm or more and 10 µm or less of 80% or more of the whole powder, is high in degree of orientation and in coercive force. To realize such a powder, grinding by the jet mill is preferable.

For example, in the case of grinding by the ball mill, even if the average grain size of the powder is 2 µm or more and 5 µm or less, a large amount of fine powder having a grain size on a sub-micron level is contained. When the fine powder aggregates, the c-axes of crystals in a $TbCu_7$ crystal phase become unlikely to align in a direction of easy magnetization axis during magnetic field orientation at the time of press-forming, and the degree of orientation is likely to deteriorate. Further, such a fine powder may increase the amount of the oxide in the sintered compact to decrease the coercive force. In particular, when the Fe concentration is 23 at % or more, the ratio of powder having a grain size of 10 µm or more in the powder after the grinding is preferably 10% or less of the whole powder. When the Fe concentration is 23 at % or more, the amount of the hetero-phase in the ingot being a raw material increases. In the hetero-phase, not only the amount of powder increases but also the grain size tends to increase, and the grain size sometimes becomes 20 µm or more.

At the time of grinding such an ingot, for example, powder having a grain size of 15 µm or more sometimes becomes a hetero-phase powder as it is. When the ground powder containing such a hetero-phase coarse powder is pressed in a magnetic field into a sintered compact, the hetero-phase remains to cause decrease in coercive force, decrease in magnetization, and decrease in squareness. The decrease in the squareness makes the magnetization difficult. In particular, magnetization after assembly to the rotor or the like becomes difficult. As described above, setting the powder having a grain size of 10 μm or more to 10% or less of the whole makes it possible to increase the coercive force while suppressing the decrease in squareness ratio in the high Fe concentration composition containing 23 at % or more Fe.

Next, the alloy powder is filled in a mold placed in an electromagnet and is press-formed while a magnetic field is applied thereto, whereby a green compact whose crystal axes are oriented is manufactured. By sintering the green compact at 1100° C. or higher and 1210° C. or lower for 1 hour or more and 15 hours or less, a dense sintered compact is obtained.

For example, when the sintering temperature is lower than 1100° C., the density of the sintered compact to be generated is likely to lower. On the other hand, when the sintering temperature is higher than 1210° C., Sm in the powder excessively evaporates and thereby may decrease the magnetic property. The sintering temperature is more preferably 1150° C. or higher and 1205° C. or lower, and still more preferably 1165° C. or higher and 1195° C. or lower.

On the other hand, when the sintering time is less than 1 hour, the density is likely to become uneven and therefore the magnetization is likely to decrease, further the crystal grain size of the sintered compact decreases, the crystal grain boundary ratio increases, and therefore the magnetization is likely to decrease. On the other hand, when the sintering time is over 15 hours, the element R in the powder excessively evaporates and thereby may decrease the magnetic property. The sintering time is more preferably 2 hours or more and 13 hours or less, and still more preferably 4 hours or more and 10 hours or less. Note that performing a heat treatment in a vacuum or an argon gas (Ar) makes it possible to suppress oxidation. Further, a vacuum is kept until the temperature becomes close to the sintering temperature and thereafter the atmosphere is changed to an Ar atmosphere and isothermal retention is performed, thereby aking it possible to increase the sintered compact density.

Next, a solution treatment is applied to the obtained sintered compact to control its crystal structure. For example, the solution treatment is performed at 1100° C. or higher and 1190° C. or lower for 3 hours or more and 28 hours or less, whereby the $TbCu_7$ crystal phase being the precursor of the phase separation structure is easily obtained.

When the heat treatment temperature is lower than 1100° C. or is over 1190° C., the ratio of the $TbCu_7$ crystal phase existing in the sample after the solution treatment is small and a good magnetic property is less likely to be achieved. The heat treatment temperature is preferably 1110° C. or higher and 1180° C. or lower, and more preferably 1120° C. to 1170° C.

When the heat treatment time is less than 3 hours, the constituent phases are likely to become uneven, the coercive force becomes likely to decrease, the crystal grain size of the sintered compact is likely to decrease, the crystal grain boundary ratio increases, and the magnetization is likely to decrease. On the other hand, when the heat treatment time is over 28 hours, the element R in the sintered compact evaporates and thereby may decrease the magnetic property. The heat treatment time is preferably 4 hours or more and 24 hours or less, and more preferably 10 hours or more and 18 hours or less.

Note that performing the solution treatment in a vacuum or an insert atmosphere such as an argon gas (Ar) makes it possible to suppress oxidation of the powder. Further, the solution treatment may be performed following the sintering.

Further, the rapid cooling is performed after the isothermal retention. Performing the rapid cooling makes it possible to keep the $TbCu_7$ crystal phase even at room temperature. Setting the rapid cooling rate to 170° C./min or more makes it possible to stabilize the $TbCu_7$ crystal phase to cause a coercive force to be easily exhibited. For example, the rapid cooling rate is lower than 170° C./min, a $Ce_2Ni_7$ crystal phase (2-7 phase) is likely to be generated during the cooling. The existence of the 2-7 phase may decrease the magnetization and may also decrease the coercive force. This is because the 2-7 phase has often been thickened, so that the Cu concentration in the main phase decreases to make occurrence of the phase separation by the aging treatment difficult. In particular, in the composition containing 23 at % or more Fe, the cooling rate is likely to be important.

Next, the sintered compact after the rapid cooling is subjected to an aging treatment. The aging treatment means a treatment of enhancing the coercive force of the magnet by controlling the metal structure, and is intended to phase-separate the metal structure of the magnet into a plurality of phases such as the $Th_2Zn_{17}$ crystal phase, the Cu-rich phase and so on. The aging treatment here can be divided into a preliminary aging treatment and a main aging treatment. For example, in the preliminary aging treatment, the sintered compact is retained at 550° C. or higher and 850° C. or lower for 0.5 hours or more and 10 hours or less, and then gradually cooled to 200° C. or higher and 450° C. or lower at a cooling rate of 0.2° C./min or more and 5° C./min or less.

Setting a preliminary aging treatment temperature lower than a main aging treatment temperature by a fixed temperature or more, makes it possible to increase the nucleation frequency of the Cu-rich phase and increase the number of intersections of the Cu-rich phases, thereby improving the squareness ratio. Note that when the preliminary aging treatment temperature is lower than 550° C., the density of the Cu-rich phase increases, the volume fraction of the Cu-rich phase increases, and the Cu concentration in each Cu-rich phase decreases. This conversely decreases the domain wall pinning effect, the coercive force hardly increases even if the main aging treatment is performed thereafter, and deterioration in squareness ratio, decrease in magnetization and the like may occur. A diffusion behavior of the element is considered to be involved therein. For example, when the volume fraction of the Cu-rich phase increases, the volume fraction of the $Th_2Zn_{17}$ crystal phase being the phase responsible for magnetization decreases, resulting in decrease in magnetization. Further, when the preliminary aging treatment temperature becomes higher than 850° C., the squareness ratio improvement effect may decrease. The preliminary aging treatment temperature is more preferably 550° C. or higher and 750° C. or lower, and still more preferably 600° C. or higher and 710° C. or lower.

Further, in the above aging treatment, attention should be paid to the relation between the preliminary aging treatment temperature and the main aging treatment temperature. Decreasing the preliminary aging treatment temperature further improves the squareness ratio but makes it difficult to increase the coercive force. A conceivable cause of the decrease in coercive force is insufficient formation of the cell wall phase by the main aging treatment. Hence, in this embodiment, the main aging treatment temperature is increased to promote the element diffusion. Concretely, the difference between the preliminary aging treatment temperature and the main aging treatment temperature is set to 130° C. or more. This makes it possible to, even in a composition containing 23 at % or more Fe, increase the Cu concentration in the Cu-rich phase while increasing the number of intersections of the Cu-rich phases. For example, it is possible to set the number of intersections of the Cu-rich phases existing in an area of 1 µm square to 10 or more, more preferably 15 or more, and still more preferably 20 or more. Accordingly, an excellent squareness ratio, a high coercive force, and high magnetization can be realized at the same time. The difference between the preliminary aging treatment temperature and the main aging treatment temperature is preferably 130° C. or more and 250° C. or less, and more preferably 135° C. or more and 180° C. or less.

Further, in the main aging treatment, the sintered compact is retained at 750° C. or higher and 880° C. or lower for 2 hours or more and 80 hours or less, and then gradually cooled to 300° C. or higher and 650° C. or lower at a cooling rate of 0.2° C./min or more and 2° C./min or less. In this event, by retaining the sintered compact at 300° C. or higher and 650° C. or lower for a fixed time, the coercive force can also be improved. The retention time in this event is preferably 1 hour or more and 6 hours or less.

Note that by performing the preliminary aging treatment and the main aging treatment in a vacuum or an insert gas such as an argon gas, oxidation of the sintered compact can be suppressed.

With the above, a permanent magnet can be manufactured.

Second Embodiment

The permanent magnet in the first embodiment can be used for various motors and power generators, and can also be used as a stationary magnet or a variable magnet of variable magnetic flux motors and variable magnetic flux power generators. The permanent magnet in the first embodiment is used to constitute various motors and power generators. When the permanent magnet in the first embodiment is applied to the variable magnetic flux motor, techniques disclosed in JP-A No. 2008-29148 and JP-A No. 2008-43172 are applicable to the configuration and drive system of the variable magnetic flux motor.

Figure 3:
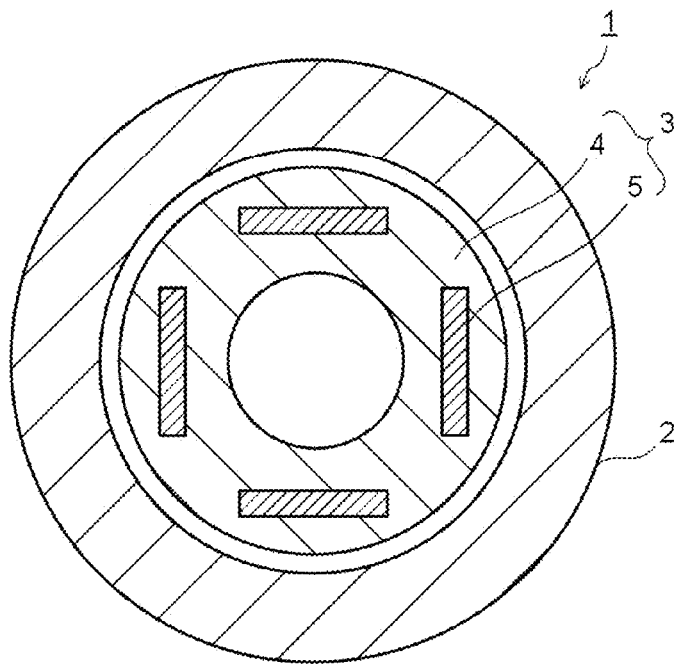
FIG. 3 is a view illustrating a permanent magnet motor.

Next, a motor and a power generator including the permanent magnet in this embodiment will be described referring to the drawings. FIG. 3 is a view illustrating a permanent magnet motor in this embodiment. In a permanent magnet motor 1 illustrated in FIG. 3, a rotor 3 is arranged in a stator 2. In an iron core 4 of the rotor 3, permanent magnets 5 being the permanent magnets in the first embodiment are arranged. Using the permanent magnets in the first embodiment enables increased efficiency, downsizing, and cost reduction and so on, on the basis of the properties and so on of the permanent magnets.

Figure 4:
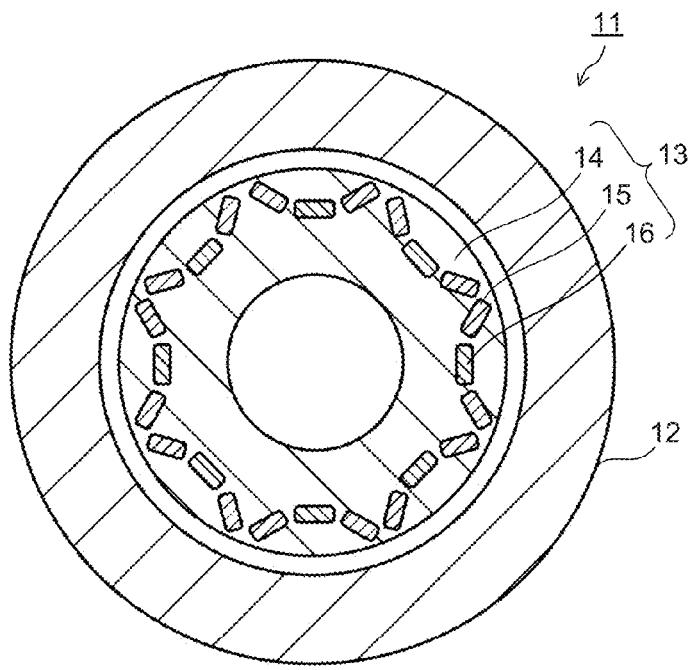
FIG. 4 is a view illustrating a variable magnetic flux motor.

FIG. 4 is a view illustrating a variable magnetic flux motor according to this embodiment. In a variable magnetic flux motor 11 illustrated in FIG. 4, a rotor 13 is disposed in a stator 12. In an iron core 14 of the rotor 13, the permanent magnets in the first embodiment are disposed as stationary magnets 15 and variable magnets 16. The magnetic flux density (flux quantum) of the variable magnet 16 can be variable. The variable magnet 16 is not influenced by a Q-axis current because its magnetization direction is perpendicular to a Q-axis direction, and can be magnetized by a D-axis current. In the rotor 13, a magnetization winding (not illustrated) is provided. When a current is passed through the magnetization winding from a magnetizing circuit, its magnetic field acts directly on the variable magnets 16.

According to the permanent magnet in the first embodiment, a coercive force suitable for the stationary magnet 15 can be obtained. When the permanent magnet in the first embodiment is applied to the variable magnet 16, it is only necessary to control the coercive force, for example, to a range of 100 kA/m or more and 500 kA/m or less by changing the various conditions (aging treatment condition and so on) of the aforesaid manufacturing method. Note that in the variable magnetic flux motor 11 illustrated in FIG. 4, the permanent magnet in the first embodiment is usable as both of the stationary magnet 15 and the variable magnet 16, and the permanent magnet in the first embodiment may be used as either one of the magnets. The variable magnetic flux motor 11 is capable of outputting large torque with a small device size and thus is suitable for motors of hybrid vehicles, electric vehicles and the like whose motors are required to have a high output and a small size.

Figure 5:
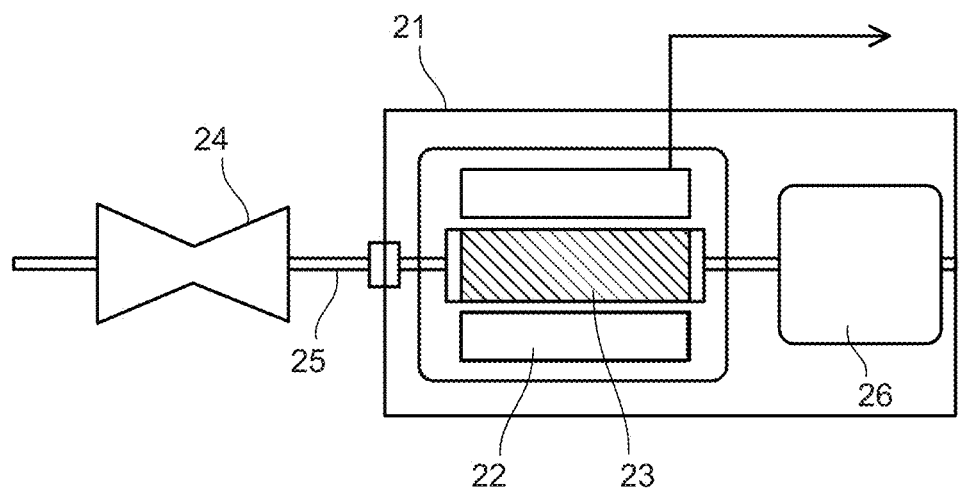
FIG. 5 is a view illustrating a power generator.

FIG. 5 illustrates a power generator according to this embodiment. A power generator 21 illustrated in FIG. 5 includes a stator 22 using the permanent magnet in this embodiment. A rotor 23 disposed inside the stator 22 is connected via a shaft 25 to a turbine 24 provided at one end of the power generator 21. The turbine 24 rotates by an externally supplied fluid for instance. Instead of the turbine 24 rotating by the fluid, the shaft 25 can also be rotated by transmitting dynamic rotation such as regenerative energy of a vehicle. As the stator 22 and the rotor 23, various publicly known structures are adoptable.

The shaft 25 is in contact with a commutator (not illustrated) disposed opposite the turbine 24 with respect to the rotor 23, so that an electromotive force generated by the rotation of the rotor 23 is boosted to a system voltage and transmitted as an output of the power generator 21 via an isolated phase bus and a traction transformer (not illustrated). The power generator 21 may be either of an ordinary power generator and a variable magnetic flux power generator. Note that the rotor 23 is electrically charged due to static electricity from the turbine 2 and a shaft current accompanying the power generation. Therefore, the power generator 21 includes a brush 26 for discharging the charged electricity of the rotor 23.

As described above, applying the permanent magnet in the first embodiment to the power generator provides effects such as increased efficiency, downsizing, cost reduction and so on.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. These embodiments and their modifications fall within the scope and spirit of the inventions and fall within the scope of the inventions described in claims and their equivalents.

EXAMPLES

In examples, concrete examples of the permanent magnet will be described.

Example 1 and Example 2

Respective raw materials to be used for the permanent magnet were weighed and mixed at predetermined ratios and were then subjected to arc-melting in an Ar gas atmosphere, whereby alloy ingots were fabricated. The alloy ingots were retained at 1175° C. for 10 hours and thereby subjected to a heat treatment, and the alloy ingots were then coarsely ground and ground by a jet mill, whereby alloy powders as raw material powders of magnets were prepared. The alloy powders were press-formed in a magnetic field, whereby compression-molded bodies were fabricated. Then, the compression-molded bodies of the alloy powders were disposed in a chamber of a sintering furnace, the inside of the chamber was brought to a vacuum state and then raised up to 1180° C. and kept as it for 1 minute, then an Ar gas was led thereinto, the temperature was raised up to 1195° C. in an Ar atmosphere, and the temperature was kept for 4 hours for performing main sintering.

Subsequently to the main sintering step, the sintered compacts were retained at 1160° C. for 10 hours and thereby subjected to a solution treatment. Note that the cooling rate after the solution treatment was set to −220° C./min. Then, the sintered compacts after the solution treatment were retained at 670° C. for 2 hours as the preliminary aging treatment and then gradually cooled to room temperature, and further retained at 815° C. for 40 hours as the main aging treatment. The sintered compacts subjected to the aging treatment under such conditions were gradually cooled to 420° C. and retained at the temperature for 1 hour. Thereafter, the sintered compacts were furnace-cooled to room temperature, whereby magnets were obtained. The compositions of the obtained magnets are as listed in Table 1.

A composition analysis of the magnet was carried out by an inductively coupled plasma (ICP) method. Note that the composition analysis by the ICP method was carried out in the following procedure. First, a sample picked up from a described measurement point was ground in a mortar, a predetermined amount of the ground sample was weighed and put into a quartz beaker. Further, a mixed acid (acid containing nitric acid and hydrochloric acid) was put into the beaker and heated to about 140° C. on a hotplate, whereby the sample in the beaker was completely melted. It was left standing to cool, then transferred to a polyethyl acrylate (PEA) volumetric flask, and quantified to be a sample solution. Further, quantities of components of the sample solution were determined by a calibration curve method using an ICP emission spectrochemical analyzer. As the ICP emission spectrochemical analyzer, SPS4000 manufactured by SII Nano Technology Inc. was used. Further, the number of intersections of the Cu-rich phases existing in an area of 1 μm square (Cu-rich phase intersection number), the Cu concentration in the Cu-rich phase (Cu-rich phase Cu concentration), the squareness ratio, the coercive force, and the residual magnetization of each of the magnets are listed in Table 3.

Example 3, Example 4, and Example 5

Respective raw materials were weighed and mixed at predetermined ratios and then subjected to high-frequency melting in an Ar gas atmosphere, whereby alloy ingots were fabricated. The alloy ingots were coarsely ground, then heat-treated at 1160° C. for 4 hours, and cooled to room temperature by rapid cooling. Further, they were coarsely ground and ground by a jet mill, whereby alloy powders as raw material powders of magnets were prepared. Further, the alloy powders were press-formed in a magnetic field, whereby compression-molded bodies were fabricated.

Next, the compression-molded bodies of the alloy powders were disposed in a chamber of a sintering furnace, the inside of the chamber was brought to a vacuum state of a degree of vacuum of 9.0×10⁻³ Pa and then raised up to 1170° C. and kept as it was for 5 minutes, and then an Ar gas was led into the chamber. The temperature inside the chamber brought into an Ar atmosphere was raised up to 1185° C., and kept as it was for 6 hours for performing main sintering. Next, the sintered compacts were retained at 1120° C. for 12 hours and thereby subjected to a solution treatment. Note that the cooling rate after the solution treatment was set to −200° C./min.

Next, as listed in Table 2, the sintered compacts after the solution treatment were retained at 705° C. for 1 hour as the preliminary aging treatment, and then gradually cooled to room temperature. The sintered compacts were then retained at 840° C. for 25 hours as the main aging treatment, gradually cooled to 370° C. and retained for 2 hours, and then furnace-cooled to room temperature, whereby magnets were obtained. The compositions of the magnets are as listed in Table 1. Note that the compositions of the magnets were confirmed by the ICP method as in the other examples. Further, the Cu-rich phase intersection number, the Cu-rich phase Cu concentration, the squareness ratio, the coercive force, and the residual magnetization of each of the magnets are listed in Table 3.

Example 6

Respective raw materials were weighed and mixed at predetermined ratios and then subjected to high-frequency melting in an Ar gas atmosphere, whereby an alloy ingot was fabricated. The alloy ingot was coarsely ground, then heat-treated at 1180° C. for 3 hours, and cooled to room temperature by rapid cooling. Further, it was coarsely ground and ground by a jet mill, whereby an alloy powder as a raw material powder of a magnet was prepared. Further, the alloy powder was press-formed in a magnetic field, whereby a compression-molded body was fabricated.

Next, the compression-molded body of the alloy powder was disposed in a chamber of a sintering furnace, the inside of the chamber was brought to a vacuum state of a degree of vacuum of 9.0×10⁻³ Pa and then raised up to 1155° C. and kept as it was for 30 minutes, and then an Ar gas was led into the chamber. The temperature inside the chamber brought into an Ar atmosphere was raised up to 1190° C., and kept as it was for 3 hours for performing main sintering. Next, the sintered compact was retained at 1130° C. for 16 hours and thereby subjected to a solution treatment. Note that the cooling rate after the solution treatment was set to −180° C./min.

Next, as listed in Table 2, the sintered compact after the solution treatment was retained at 700° C. for 1.5 hours as the preliminary aging treatment, and then gradually cooled to room temperature. The sintered compact was then retained at 850° C. for 35 hours as the main aging treatment, gradually cooled to 360° C. and retained as it was for 1.5 hours, and then furnace-cooled to room temperature, whereby a magnet was obtained. The composition of the obtained magnet is as listed in Table 1. Note that the composition of the magnet was confirmed by the ICP method as in the other examples. Further, the Cu-rich phase intersection number, the Cu-rich phase Cu concentration, the squareness ratio, the coercive force, and the residual magnetization of the magnet are listed in Table 3.

Example 7

Respective raw materials were weighed and mixed at predetermined ratios and then subjected to high-frequency melting in an Ar gas atmosphere, whereby an alloy ingot was fabricated. The alloy ingot was coarsely ground, then heat-treated at 1170° C. for 12 hours, and cooled to room temperature by rapid cooling. Further, it was coarsely ground and ground by a jet mill, whereby an alloy powder as a raw material powder of a magnet was prepared. Further, the alloy powder was press-formed in a magnetic field, whereby a compression-molded body was fabricated.

Next, the compression-molded body of the alloy powder was disposed in a chamber of a sintering furnace, the inside of the chamber was brought to a vacuum state of a degree of vacuum of $9.0 \times 10^{-3}$ Pa and then raised up to 1155° C. and kept as it was for 30 minutes, and then an Ar gas was led into the chamber. The temperature inside the chamber brought into an Ar atmosphere was raised up to 1180° C., and kept as it was for 10 hours for performing main sintering. Next, the sintered compact was retained at 1120° C. for 16 hours and thereby subjected to a solution treatment. Note that the cooling rate after the solution treatment was set to −240° C./min.

Next, as listed in Table 2, the sintered compact after the solution treatment was retained at 680° C. for 3 hours as the preliminary aging treatment, and then gradually cooled to room temperature. The sintered compact was then retained at 820° C. for 50 hours as the main aging treatment, gradually cooled to 400° C. and retained as it was for 2 hours, and then furnace-cooled to room temperature, whereby a magnet was obtained. The composition of the obtained magnet is as listed in Table 1. Note that the composition of the magnet was confirmed by the ICP method as in the other examples. Further, the Cu-rich phase intersection number, the Cu-rich phase Cu concentration, the squareness ratio, the coercive force, and the residual magnetization of the magnet are listed in Table 3.

Example 8

Respective raw materials were weighed and mixed at predetermined ratios and then subjected to high-frequency melting in an Ar gas atmosphere, whereby an alloy ingot was fabricated. The alloy ingot was coarsely ground, then heat-treated at 1170° C. for 6 hours, and cooled to room temperature by rapid cooling. Further, it was coarsely ground and ground by a jet mill, whereby an alloy powder as a raw material powder of a magnet was prepared. Further, the alloy powder was press-formed in a magnetic field, whereby a compression-molded body was fabricated.

Next, the compression-molded body of the alloy powder was disposed in a chamber of a sintering furnace, the inside of the chamber was brought to a vacuum state of a degree of vacuum of $9.0 \times 10^{-3}$ Pa and then raised up to 1165° C. and kept as it was for 15 minutes, and then an Ar gas was led into the chamber. The temperature inside the chamber brought into an Ar atmosphere was raised up to 1195° C., and kept as it was for 4 hours for performing main sintering. Next, the sintered compact was retained at 1125° C. for 12 hours and thereby subjected to a solution treatment. Note that the cooling rate after the solution treatment was set to −180° C. min.

Next, as listed in Table 2, the sintered compact after the solution treatment was retained at 675° C. for 4 hours as the preliminary aging treatment, and then gradually cooled to room temperature. The sintered compact was then retained at 830° C. for 35 hours as the main aging treatment, gradually cooled to 350° C. and retained as it was for 2 hours, and then furnace-cooled to room temperature, whereby a magnet was obtained. The composition of the obtained magnet is as listed in Table 1. Note that the composition of the magnet was confirmed by the ICP method as in the other examples. Further, the Cu-rich phase intersection number, the Cu-rich phase Cu concentration, the squareness ratio, the coercive force, and the residual magnetization of the magnet are listed in Table 3.

Example 9, Example 10, and Example 11

Alloy powders having the same composition as that of Example 8 were used as raw materials and press-formed in a magnetic field, whereby compression-molded bodies were fabricated. The compression-molded bodies were disposed in a chamber of a sintering furnace, the inside of the chamber was brought to a vacuum state of a degree of vacuum of $9.0 \times 10^{-3}$ Pa and then raised up to 1165° C. and kept as it was for 15 minutes, and then an Ar gas was led into the chamber. The temperature inside the chamber brought into an Ar atmosphere was raised up to 1195° C., and kept as it was for 4 hours for performing main sintering.

Next, a solution treatment was carried out under the same conditions as those of Example 8. Further, as listed in Table 2, the sintered compact was retained at 700° C. for 4 hours as the preliminary aging treatment and then gradually cooled to room temperature in Example 9, the sintered compact was retained at 670° C. for 4 hours as the preliminary aging treatment and then gradually cooled to room temperature in Example 10, and the sintered compact was retained at 675° C. for 4 hours as the preliminary aging treatment and then gradually cooled to room temperature in Example 11. The sintered compacts were then retained at 830° C. for 35 hours as the main aging treatment, gradually cooled to 350° C. and retained as they were for 2 hours, and then furnace-cooled to room temperature, whereby magnets were obtained. The compositions of the obtained magnets are as listed in Table 1. Note that the compositions of the magnets were confirmed by the ICP method as in the other examples. Further, the Cu-rich phase intersection number, the Cu-rich phase Cu concentration, the squareness ratio, the coercive force, and the residual magnetization of each of the magnets are listed in Table 3.

Comparative Example 1 and Comparative Example 2

Magnets having the compositions listed in Table 1 were fabricated by the same methods as those of Example 1 and Example 2, respectively. The Cu-rich phase intersection number, the Cu-rich phase Cu concentration, the squareness ratio, the coercive force, and the residual magnetization of each of the magnets are listed in Table 3.

Comparative Example 3, Comparative Example 4, Comparative Example 5, and Comparative Example 6

Alloy powders having the same composition as that of Example 8 were used as raw materials and press-formed in a magnetic field, whereby compression-molded bodies were fabricated. The compression-molded bodies were disposed in a chamber of a sintering furnace, the inside of the chamber was brought to a vacuum state of a degree of vacuum of $9.0 \times 10^{-3}$ Pa and then raised up to 1165° C. and kept as it was for 15 minutes, and then an Ar gas was led into the chamber. The temperature inside the chamber brought into an Ar atmosphere was raised up to 1195° C., and kept as it was for 4 hours for performing main sintering. Next, a solution treatment was carried out under the same conditions as those of Example 8.

Further, as listed in Table 2, in Comparative Example 3, the sintered compact was retained at 780° C. for 4 hours as the preliminary aging treatment and then gradually cooled to room temperature, then retained at 830° C. for 35 hours as the main aging treatment, gradually cooled to 350° C. and retained as it was for 2 hours, and then furnace-cooled to room temperature, whereby a magnet was obtained.

Further, as listed in Table 2, in Comparative Example 4, the sintered compact was retained at 675° C. for 4 hours as the preliminary aging treatment and then gradually cooled to room temperature, then retained at 900° C. for 35 hours as the main aging treatment, gradually cooled to 350° C. and retained as it was for 2 hours, and then furnace-cooled to room temperature, whereby a magnet was obtained.

Further, as listed in Table 2, in Comparative Example 5, the sintered compact was retained at 675° C. for 4 hours as the preliminary aging treatment and then gradually cooled to room temperature, then retained at 780° C. for 35 hours as the main aging treatment, gradually cooled to 350° C. and retained as it was for 2 hours, and then furnace-cooled to room temperature, whereby a magnet was obtained.

Further, as listed in Table 2, in Comparative Example 6, the sintered compact was retained at 450° C. for 4 hours as the preliminary aging treatment and then gradually cooled to room temperature, then retained at 830° C. for 35 hours as the main aging treatment, gradually cooled to 350° C. and retained as it was for 2 hours, and then furnace-cooled to room temperature, whereby a magnet was obtained.

The compositions of the magnets are as listed in Table 1. Note that the compositions of the magnets were confirmed by the ICP method as in the other examples. Further, the Cu-rich phase intersection number, the Cu-rich phase Cu concentration, the squareness ratio, the coercive force, and the residual magnetization of each of the magnets are listed in Table 3.

As is clear from Table 1 to Table 3, the permanent magnets in Example 1 to Example 7 are higher in Cu concentration in the Cu-rich phase and larger in the number of intersections of the Cu-rich phases than, for example, the permanent magnet in Comparative Example 1 having an Sm concentration of 12.73% and the permanent magnet in Comparative Example 2 having a Zr concentration of 4.84%, and thus each exhibit excellent squareness ratio, high coercive force, and high magnetization. This shows that adjusting the amounts of elements constituting the permanent magnet enables enhancement of the magnet property.

Further, the permanent magnets in Example 8 to Example 11 are larger in the number of intersections of the Cu-rich phases than the permanent magnet in Comparative Example 3 in which the preliminary aging treatment temperature is 780° C. and the temperature difference between the preliminary aging treatment temperature and the main aging treatment temperature is 50° C., and thus each exhibit excellent squareness ratio, high coercive force, and high magnetization. This shows that controlling the preliminary aging treatment temperature and the temperature difference between the preliminary aging treatment temperature and the main aging treatment temperature enables enhancement of the magnet property.

Further, the permanent magnets in Example 8 to Example 11 are larger in the number of intersections of the Cu-rich phases than, for example, the permanent magnet in Comparative Example 4 in which the main aging treatment temperature is 900° C. and the temperature difference between the preliminary aging treatment temperature and the main aging treatment temperature is 225° C., and thus each exhibit excellent squareness ratio, high coercive force, and high magnetization. This shows that controlling the main aging treatment temperature and the temperature difference between the preliminary aging treatment temperature and the main aging treatment temperature enables enhancement of the magnet property.

Further, the permanent magnets in Example 8 to Example 11 are higher in Cu concentration in the Cu-rich phase and larger in the number of intersections of the Cu-rich phases than, for example, the permanent magnet in Comparative Example 5 in which the main aging treatment temperature is 780° C. and the temperature difference between the preliminary aging treatment temperature and the main aging treatment temperature is 105° C., and thus each exhibit excellent squareness ratio, high coercive force, and high magnetization. This shows that controlling the main aging treatment temperature and the temperature difference between the preliminary aging treatment temperature and the main aging treatment temperature enables enhancement of the magnet property.

Further, the permanent magnets in Example 8 to Example 11 are higher in Cu concentration in the Cu-rich phase than, for example, the permanent magnet in Comparative Example 6 in which the preliminary aging treatment temperature is 450° C. and the temperature difference between the preliminary aging treatment temperature and the main aging treatment temperature is 380° C., and thus each exhibit excellent squareness ratio, high coercive force, and high magnetization. This shows that controlling the preliminary aging treatment temperature and the temperature difference between the preliminary aging treatment temperature and the main aging treatment temperature enables enhancement of the magnet property.

As described above, the magnets in Example 1 to Example 11, in which the Cu concentration in the Cu-rich phase is as high as 30% or more and the number of intersections of the Cu-rich phases is as large as 10 or more, each exhibit excellent squareness ratio, high coercive force, and high magnetization even if the Fe concentration is 23% or more. This shows that the permanent magnets in Example 1 to Example 11 are excellent in magnet property.

TABLE 1

MAGNET COMPOSITION (ATOMIC RATIO)
(Other: (Example) 1: Ce, 2: Ti, 3: Mn, 4: Cr 5:
Al0.0115 + Cr0.015, (Comparative Example) 1: Cr, 2: Ti)

|  | Sm | Co | Fe | Cu | Zr | Other |
|---|---|---|---|---|---|---|
| Example 1 | 11.01 | 56.99 | 23.52 | 5.33 | 2.93 | 0.22 |
| Example 2 | 11.98 | 54.57 | 25.97 | 5.72 | 1.70 | 0.06 |
| Example 3 | 10.81 | 53.16 | 29.08 | 5.17 | 1.43 | 0.35 |
| Example 4 | 11.30 | 53.18 | 29.27 | 4.44 | 1.73 | 0.08 |
| Example 5 | 10.99 | 50.02 | 28.04 | 9.08 | 1.69 | 0.18 |
| Example 6 | 11.11 | 50.00 | 31.91 | 5.24 | 1.74 | 0.00 |
| Example 7 | 11.24 | 47.80 | 34.17 | 5.24 | 1.55 | 0.00 |
| Example 8 | 11.17 | 50.90 | 30.91 | 5.33 | 1.69 | 0.00 |
| Example 9 | 11.17 | 50.90 | 30.91 | 5.33 | 1.69 | 0.00 |
| Example 10 | 11.17 | 50.90 | 30.91 | 5.33 | 1.69 | 0.00 |
| Example 11 | 11.17 | 50.90 | 30.91 | 5.33 | 1.69 | 0.00 |
| Comparative Example 1 | 12.73 | 55.86 | 23.06 | 5.22 | 2.87 | 0.26 |
| Comparative Example 2 | 11.98 | 51.42 | 25.97 | 5.72 | 4.84 | 0.07 |
| Comparative Example 3 | 11.17 | 50.90 | 30.91 | 5.33 | 1.69 | 0.00 |
| Comparative Example 4 | 11.17 | 50.90 | 30.91 | 5.33 | 1.69 | 0.00 |

TABLE 1-continued

MAGNET COMPOSITION (ATOMIC RATIO)
(Other: (Example) 1: Ce, 2: Ti, 3: Mn, 4: Cr 5:
Al0.0115 + Cr0.015, (Comparative Example) 1: Cr, 2: Ti)

|  | Sm | Co | Fe | Cu | Zr | Other |
|---|---|---|---|---|---|---|
| Comparative Example 5 | 11.17 | 50.90 | 30.91 | 5.33 | 1.69 | 0.00 |
| Comparative Example 6 | 11.17 | 50.90 | 30.91 | 5.33 | 1.69 | 0.00 |

TABLE 2

|  | Preliminary aging treatment temperature (° C.) | Main aging treatment temperature (° C.) | Temperature difference (° C.) |
|---|---|---|---|
| Example 1 | 670 | 815 | 145 |
| Example 2 | 670 | 815 | 145 |
| Example 3 | 705 | 840 | 135 |
| Example 4 | 705 | 840 | 135 |
| Example 5 | 705 | 840 | 135 |
| Example 6 | 700 | 850 | 150 |
| Example 7 | 680 | 820 | 140 |
| Example 8 | 675 | 830 | 155 |
| Example 9 | 700 | 830 | 130 |
| Example 10 | 670 | 830 | 160 |
| Example 11 | 675 | 840 | 165 |
| Comparative Example 1 | 670 | 815 | 145 |
| Comparative Example 2 | 670 | 815 | 145 |
| Comparative Example 3 | 780 | 830 | 50 |
| Comparative Example 4 | 675 | 900 | 225 |
| Comparative Example 5 | 675 | 780 | 105 |
| Comparative Example 6 | 450 | 830 | 380 |

TABLE 3

|  | Cu rich phase intersection number | Cu rich phase Cu concentration (mol %) | Squareness ratio (%) | Coercive force iHc (kA/m) | Residual magnetization (T) |
|---|---|---|---|---|---|
| Example 1 | 45 | 38 | 94.1 | 1610 | 1.145 |
| Example 2 | 38 | 36 | 92.9 | 1430 | 1.175 |
| Example 3 | 29 | 41 | 91.5 | 1230 | 1.2 |
| Example 4 | 30 | 30 | 90.6 | 1150 | 1.205 |
| Example 5 | 24 | 52 | 90.8 | 1300 | 1.195 |
| Example 6 | 19 | 39 | 90.1 | 1100 | 1.25 |
| Example 7 | 23 | 32 | 89.5 | 1050 | 1.26 |
| Example 8 | 25 | 47 | 92.5 | 1380 | 1.24 |
| Example 9 | 12 | 47 | 90.2 | 1410 | 1.245 |
| Example 10 | 35 | 40 | 92.8 | 1320 | 1.24 |
| Example 11 | 80 | 34 | 93.4 | 1280 | 1.23 |
| Comp. Exam. 1 | 7 | 10 | 65.5 | 220 | 1.145 |
| Comp. Exam. 2 | 5 | 14 | 72.7 | 340 | 1.17 |
| Comp. Exam. 3 | 6 | 35 | 78.2 | 1400 | 1.18 |
| Comp. Exam. 4 | 8 | 45 | 69.4 | 1280 | 1.15 |

TABLE 3-continued

|  | Cu rich phase intersection number | Cu rich phase Cu concentration (mol %) | Squareness ratio (%) | Coercive force iHc (kA/m) | Residual magnetization (T) |
|---|---|---|---|---|---|
| Comp. Exam. 5 | 8 | 26 | 70.7 | 600 | 1.175 |
| Comp. Exam. 6 | 108 | 22 | 84.5 | 800 | 1.19 |

What is claimed is:

1. A permanent magnet comprising:
a composition expressed by a composition formula:

$$R_p Fe_q M_r Cu_t Co_{100-p-q-r-t}$$

where, R is at least one element selected from the group consisting of rare-earth elements, M is at least one element selected from the group consisting of Zr, Ti, and Hf, p is a number satisfying $10.5 \le p \le 12.5$ at %, q is a number satisfying $23 \le q \le 40$ at %, r is a number satisfying $0.88 \le r \le 4.5$ at %, and t is a number satisfying $4.5 \le t \le 10.7$ at %; and a metal structure containing a $Th_2Zn_{17}$ crystal phase and a Cu-rich phase having a Cu concentration higher than that of the $Th_2Zn_{17}$ crystal phase, wherein a number of intersections of the Cu-rich phases existing in an area of 1 μm square in a cross section including a c-axis of the $Th_2Zn_{17}$ crystal phase is 10 or more.

2. The permanent magnet of claim 1, wherein the number of intersections is 120 or less.

3. The permanent magnet of claim 1, wherein the Cu concentration in the Cu-rich phase is 30 at % or more.

4. The permanent magnet of claim 1, wherein 50 at % or more of a total amount of the element R in the composition formula is Sm.

5. The permanent magnet of claim 1, wherein 50 at % or more of the element M in the composition formula is Zr.

6. The permanent magnet of claim 1, wherein 20 at % or less of Co in the composition formula is substituted by at least one element selected from among Ni, V, Cr, Mn, Al, Ga, Nb, Ta, and W.

7. A motor comprising the permanent magnet of claim 1.

8. A power generator comprising the permanent magnet of claim 1.

9. The motor of claim 7, further comprising:
a stator; and
a rotor, arranged in the stator, comprising the permanent magnet.

10. The power generator of claim 8, further comprising:
a stator; and
a rotor, arranged in the stator, comprising the permanent magnet.

11. A vehicle comprising the motor of claim 7.

12. A vehicle comprising the power generator of claim 8.

* * * * *